No. 12,603. REISSUED JAN. 29, 1907.

J. G. SNYDER.

RAIL TIE AND FASTENING.

APPLICATION FILED SEPT. 25, 1906.

Witnesses:
Florence Hurst
G. M. Stucker

Inventor:
John G. Snyder
by
Grant Burroughs
Atty.

UNITED STATES PATENT OFFICE.

JOHN G. SNYDER, OF ALTOONA, PENNSYLVANIA, ASSIGNOR OF TWO-FIFTHS TO JOHN WOOLF PLANK, OF CARLISLE, PENNSYLVANIA.

RAIL TIE AND FASTENING

No. 12,603. Specification of Reissued Letters Patent. Reissued Jan. 29, 1907.

Original No. 826,376, dated July 17, 1906. Application for reissue filed September 25, 1906. Serial No. 336,208.

*To all whom it may concern:*

Be it known that I, JOHN G. SNYDER, a citizen of the United States, residing at Altoona, in the county of Blair and State of Pennsylvania, have invented certain new and useful Improvements in Rail Ties and Fastenings, of which the following is a specification.

My invention relates to improvements in rail ties and fastenings, and refers particularly to a composite tie constructed of steel and concrete.

The main object of my invention is the provision of a device of this character which will form a sufficiently strong and elastic support for the rails, which will prevent spreading or lateral movement of the rails, and which will consist of but few and simple parts and will be efficient and practical in every particular.

Other objects of the invention are to provide a tie and fastening which can be produced at a comparatively small expense and which will be practically indestructible and by means of which the laying and spacing of the rails will be greatly simplified.

With these and other objects in view my invention consists of a casing or shell adapted to contain concrete or similar material, recesses in the top of said casing adapted to receive the rails, cushions in said recesses, clamping-plates secured to the casing and engaging the foot of the rail, and means for securing said plates in position.

My invention further consists in certain other novel features of construction and combination and arrangement of parts, substantially as disclosed herein.

Figure 1:
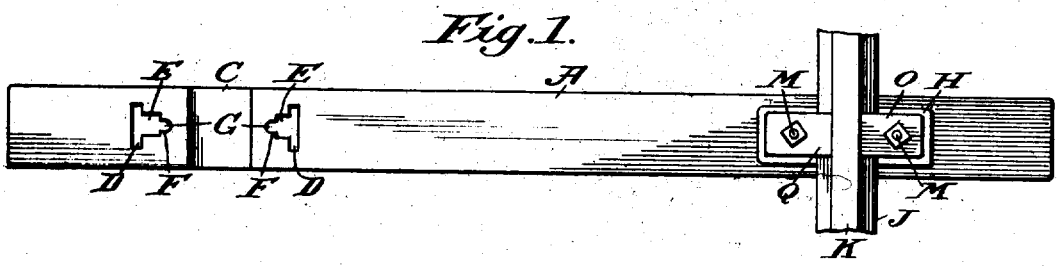
Figure 2:
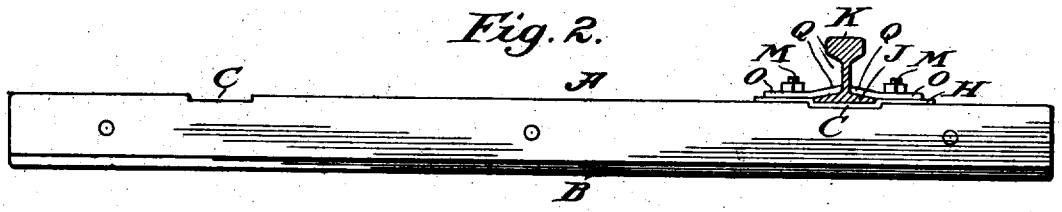
Figure 3:
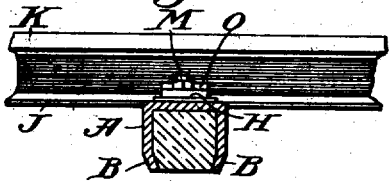
Figure 4:
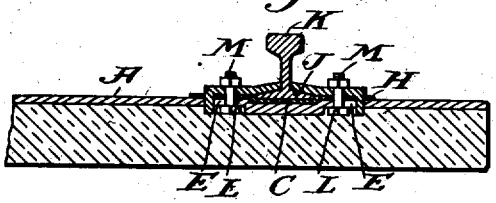
Figure 5:
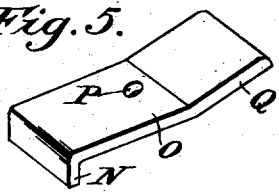
Figure 6:
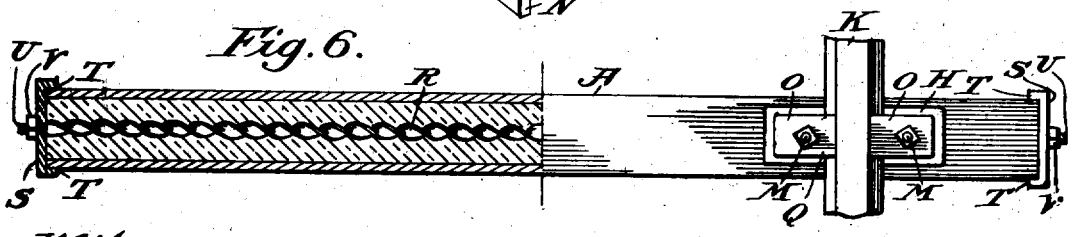

Figure 1 is a top plan view of my improved tie and fastening, showing a portion of a rail secured in position at one end and the other end with the rail removed. Fig. 2 is a side elevation of the same. Fig. 3 is a transverse sectional view of Fig. 2. Fig. 4 is a longitudinal sectional view of a portion of the tie, showing a rail secured in position. Fig. 5 is a detail perspective view of one of the clamping-plates. Fig. 6 is a top plan view of a modified form of the invention, parts being shown in section.

The tie proper consists of the casing or metallic shell A, preferably of steel and of the ordinary length of a railroad-tie. The lower sides of the tie are slightly inclined inward to form the retaining-flanges B. As the inward inclination of the retaining-flanges is slight, their lower edges are spaced a considerable distance apart to form a comparatively wide opening in the bottom of the tie. In the casing is placed a filling of concrete or other material, which is held in place by the flanges B. The comparatively wide opening in the bottom of the tie allows the filling and the material of the road-bed to contact over a considerable area, and the friction thereby produced tends to hold the tie against displacement. Upon the upper face of the tie and at the proper distance apart are the recesses C, which are adapted to receive the base of the rail. Adjacent these recesses and on either side thereof are openings consisting of the transverse slots D, communicating with the longitudinal bolt-head-receiving slots E, which terminate in the necks F, formed with the rounded ends G, adapted to form a seat for the bolt. A fiber pad or plate H fits within the recess and overlaps the sides thereof, and upon this pad and within the recess the base J of the rail K is adapted to fit. This pad forms a cushion and sound-deadener for the rail and may also act as an insulator, and the pad may be of paper fiber or any such similar material.

After the rail is in position the head L of the bolt M is inserted in the longitudinal slot and the bolt pulled up in its seat. The downward-extending tongue N of the clamping or securing plate O is inserted in the transverse slot D, and the bolt is passed through the opening P in the plate and the nut applied to the bolt. The clamping-plate is formed at its inner end with the inclined retaining-flange Q, which engages the foot of the rail and secures the rail in position in its seat.

In the modified form of my invention (shown in Fig. 6) I provide a reinforcing-rod R, which passes through the entire length of the tie, and on the ends of the rod are placed clamping-lugs S, having the lips T to engage the sides of the tie. The ends of the rod are threaded, as at U, and nuts V are mounted thereon to secure the clamping-lugs in place. This rod is spiral in form and greatly strengthens the tie and serves as a core for the concrete to harden on.

From this description, taken in connection with the drawings, it will be obvious that I have accomplished all the objects set forth in the introduction and that I provide a device of the character described which is simple and practical and very desirable.

I claim—

1. A rail tie and fastening consisting of a casing or shell open at the bottom and having the lower sides formed with inwardly-inclined flanges, said casing being adapted to contain concrete, recesses in the top of said casing adapted to receive the rail, cushions in said recesses, clamping-plates secured to the casing and engaging the foot of the rail, and means for securing said plates in position.

2. A rail tie and fastening consisting of a casing or shell containing concrete or similar material, and having the sides formed with inturned flanges, recesses in the top of said casing adapted to receive the rails, cushions in said recesses, clamping-plates engaging the foot of the rail and having tongues engaging openings in the casing, and bolts mounted in the casing and serving to secure the clamping-plates.

3. A rail tie and fastening consisting of a casing or shell having a lower open side and the side walls of the casing formed with inturned flanges, said casing adapted to contain concrete, recesses in the top of said casing adapted to receive the rails, cushioning means in said recesses, and clamping-plates engaging the foot of the rails and having tongues entering openings in the casing.

4. A rail tie and fastening consisting of a casing or shell containing concrete, recesses in the top of said casing adapted to receive the rails, clamping-plates secured to the casing and engaging the foot of the rails, a spiral rod passing through the entire length of the casing, and clamping-lugs secured on the ends of said rod.

5. A rail-tie consisting of a casing or shell having the lower sides formed with flanges inclined slightly inward with the lower edge of said flanges spaced apart to provide a comparatively wide opening in the bottom of the tie, a filling for said casing, and means for securing the rail to the casing.

In testimony whereof I hereunto affix my signature in the presence of two witnesses.

JOHN G. SNYDER.

Witnesses:
N. M. DAVIS,
GRANT BURROUGHS.